US012696998B2

(12) United States Patent
Smith

(10) Patent No.: US 12,696,998 B2
(45) Date of Patent: Aug. 4, 2026

(54) APPARATUS FOR RETAINING DISSIPATED HEAT

(71) Applicant: Marilyn A Smith, San Angelo, TX (US)

(72) Inventor: Marilyn A Smith, San Angelo, TX (US)

( * ) Notice: Subject to any disclaimer, the term of this patent is extended or adjusted under 35 U.S.C. 154(b) by 1025 days.

(21) Appl. No.: 17/453,918

(22) Filed: Nov. 8, 2021

(65) Prior Publication Data

US 2023/0144652 A1     May 11, 2023

(51) Int. Cl.
| | |
|---|---|
| *A47J 36/36* | (2006.01) |
| *A47J 36/04* | (2006.01) |
| *A47K 10/02* | (2006.01) |
| *A47K 10/12* | (2006.01) |
| *F24C 15/36* | (2006.01) |

(52) U.S. Cl.
CPC .............. *A47J 36/36* (2013.01); *A47J 36/04* (2013.01); *A47K 10/02* (2013.01); *A47K 10/12* (2013.01); *F24C 15/36* (2013.01)

(58) Field of Classification Search
CPC ....................................................... A47J 36/36
See application file for complete search history.

(56) References Cited

U.S. PATENT DOCUMENTS

| | | | | | |
|---|---|---|---|---|---|
| 5,129,695 | A | * | 7/1992 | Norman, II | B60J 11/06 |
| | | | | | 293/128 |
| 8,592,022 | B2 | * | 11/2013 | Cardinell | D06F 29/00 |
| | | | | | 428/223 |

| | | | | | |
|---|---|---|---|---|---|
| 2010/0213145 | A1 | * | 8/2010 | Swank | A47K 10/04 |
| | | | | | 211/16 |
| 2014/0068858 | A1 | * | 3/2014 | Wambeke | A47G 9/062 |
| | | | | | 5/420 |
| 2016/0081519 | A1 | * | 3/2016 | Manko | A47K 10/12 |
| | | | | | 211/16 |
| 2016/0332023 | A1 | * | 11/2016 | Taylor | B32B 5/18 |
| 2019/0216138 | A1 | * | 7/2019 | DiPierro | A41D 13/0012 |
| 2023/0068051 | A1 | * | 3/2023 | McGowan | A47K 10/12 |

FOREIGN PATENT DOCUMENTS

| | | | | | |
|---|---|---|---|---|---|
| DE | 102017000371 | A1 | * | 7/2018 | A47K 10/02 |

OTHER PUBLICATIONS

Corduroy—A Versatile Fabric with History; Raumer, Andrea; Sep. 13, 2021. Retrieved from the Internet: <URL: https://www.fabricsight.com/blogs/posts/corduroy-a-versatile-fabric-with-history?srsltid=AfmBOop7n8fnLHSNCRBg8R_OHM4_nPq3vkUr7iiuUsrcPvaAR-cWEpdP>. (Year: 2021).*

* cited by examiner

*Primary Examiner* — John J Norton

(57) ABSTRACT

Embodiments described herein are directed to an apparatus for retaining heat dissipated from an oven. The apparatus may comprise a sheet material sized to cover a portion of a front of the oven and at least one attachment connected to the sheet material. The sheet material may comprise an absorbent fabric for retaining a heat-absorbing compound. The at least one attachment may be configured to hold one side of the sheet material substantially flush against the front of the oven after the sheet material has retained the heat absorbing compound.

10 Claims, 3 Drawing Sheets

Figure 3C:
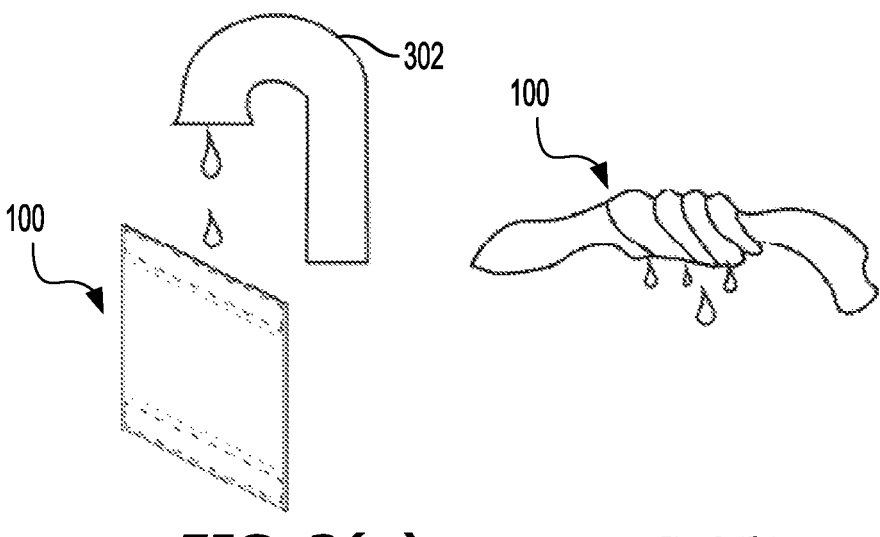

FIG. 3(a)        FIG. 3(b)

APPARATUS FOR RETAINING DISSIPATED HEAT

CROSS-REFERENCE TO RELATED APPLICATIONS

This application claims priority to U.S. Provisional Patent Application Ser. No. 63/204,980, filed Nov. 9, 2020, and entitled "Heat Absorber," the entirety of which is incorporated by reference herein.

BACKGROUND

Baking can create extreme heat in kitchens especially in the summer months. In smaller homes or apartments, heat circulates even faster. Moreover, in older homes that are usually built with a closed floor plan (where every room is separate), kitchens can become unbearably hot when baking. For some communities living on a budget, the use of a cooling unit (such as an air conditioner) may be a luxury and may not be an option for use when trying to cool a kitchen when using an oven.

DETAILED DESCRIPTION

I. Introduction

The present specification and accompanying drawings disclose one or more embodiments that incorporate the features of the present apparatus. The scope of the present apparatus is not limited to the disclosed embodiments. The disclosed embodiments merely exemplify the present apparatus, and modified versions of the disclosed embodiments are also encompassed by the present apparatus. Embodiments of the present apparatus are defined by the claims appended hereto.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. An Apparatus for Retaining Dissipated Heat

Baking can create extreme heat in kitchens especially in the summer months. In smaller homes or apartments, heat circulates even faster. Moreover, in older homes that are usually built with a closed floor plan (where every room is separate), kitchens can become unbearably hot when baking. For some communities living on a budget, the use of a cooling unit (such as an air conditioner) may be a luxury and may not be an option for use when trying to cool a kitchen when using an oven.

Figure 1:
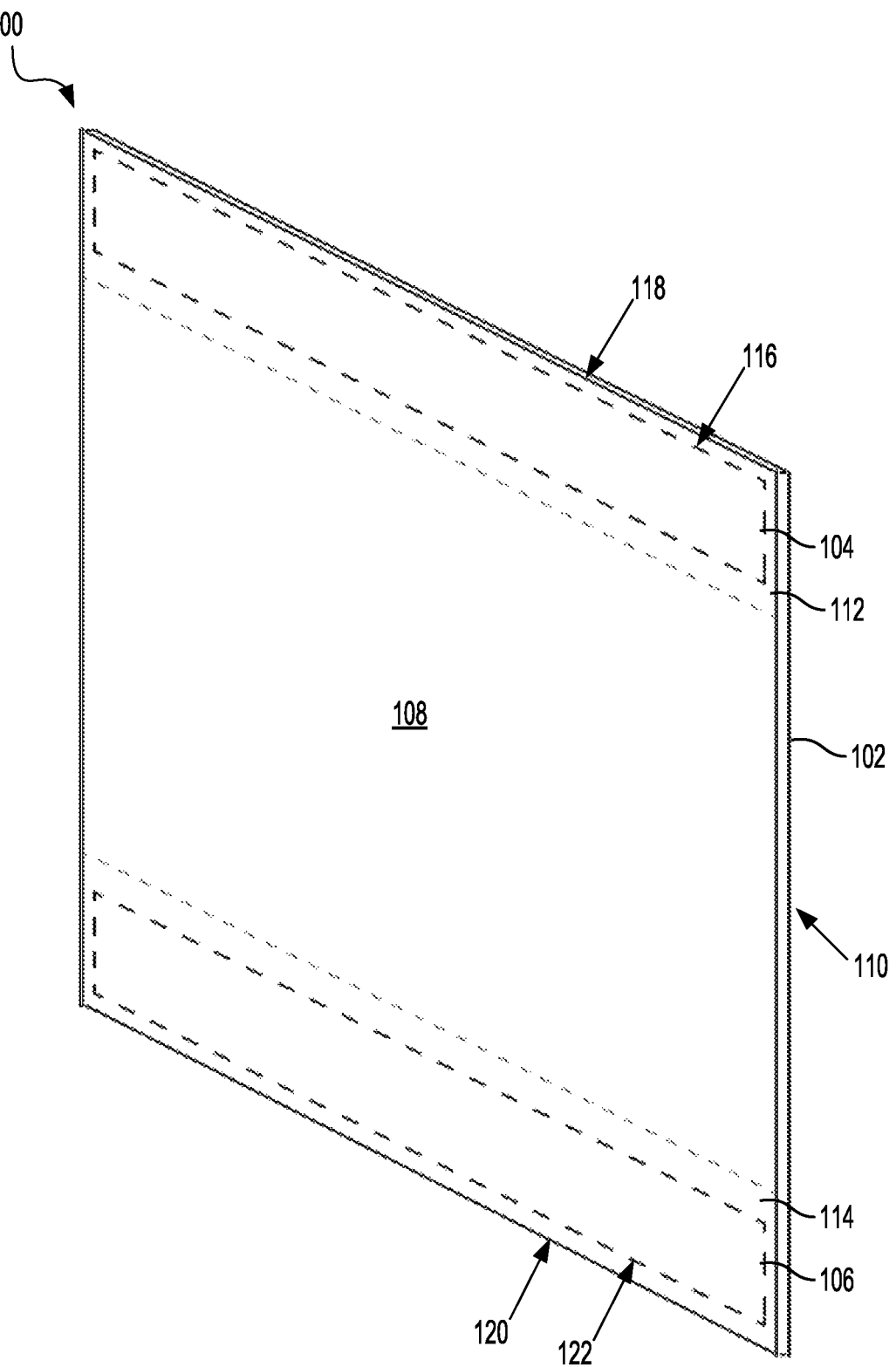
Figure 2:
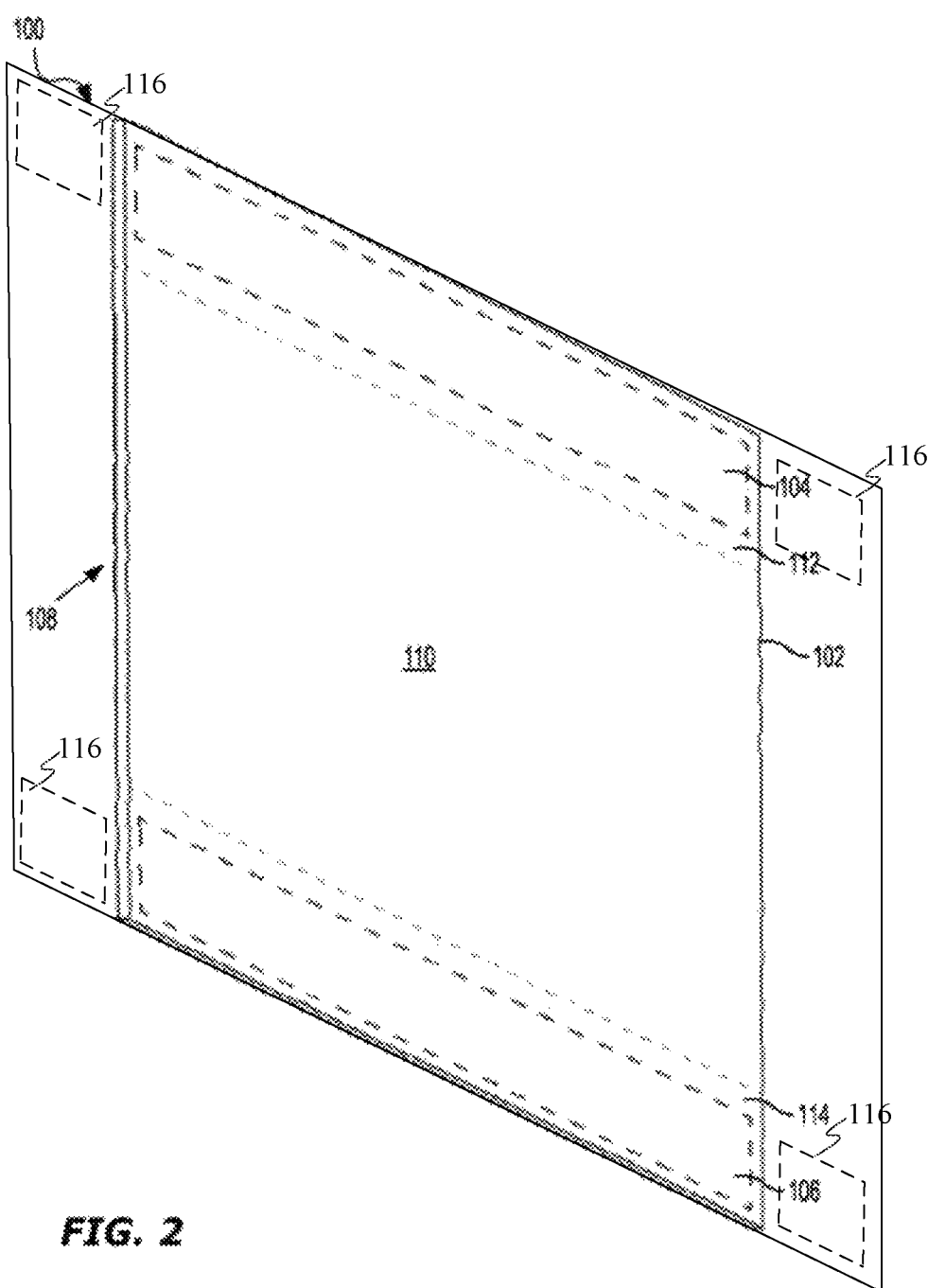

Embodiments described herein address the issues described above. For example, FIGS. 1 and 2 illustrate different perspective views of an embodiment of the apparatus for retaining heat dissipated from an oven or another device that radiates heat. In particular, this embodiment, visually represented by an apparatus 100 in FIGS. 1 and 2, assumes a rectangular-shaped, planar or sheet-like material (i.e., a material that is substantially longer and wider than thick) and includes at least one attachment connected to the sheet material. The sheet material may comprise an absorbent fabric that can retain a heat-absorbing compound (e.g., water). Then at least one attachment may be configured to hold one side of the material against the front of the oven after the material has retained the heat absorbing material.

FIG. 1 illustrates a front-side perspective view of apparatus 100. As shown in FIG. 1, apparatus 100 includes a sheet material 102 and attachments 104 and 106. In FIG. 1, sheet material 102 is depicted as rectangular and includes a first side 108 and a second side 110 (pictured in FIG. 2) that is opposite the first side 108. In other embodiments, sheet material 102 may assume any shape, such as: a triangle, a square, a pentagon, a hexagon, an octagon, a decagon, a semi-hexagon, a semi-octagon, and a semi-decagon. In accordance with embodiments described herein, sheet material 102 may be sized to cover a portion of a front of the oven. Further, sheet material 102 may comprise a flexible, absorbent fabric for retaining or absorbing a heat-absorbing compound (e.g., water). The absorbent fabric may be made of at least one of the following: linen, cotton, rayon, wool, terry cloth, fleece, hemp, and bamboo.

Additionally, apparatus 100 includes a first cavity 112 suitable for encasing attachment 104 and a second cavity 114 suitable for encasing attachment 106. In FIG. 1, attachments 104 and 106 are also depicted as rectangular. As further depicted in FIG. 1, an edge 116 of attachment 104 substantially aligns with an edge 118 of sheet material 102. Similarly, in FIG. 1, an edge 120 of attachment 106 substantially aligns with an edge 122 of sheet material 102, where edge 122 of sheet material 102 is opposite edge 118 of sheet material 102. Edges 118 and 120 may be substantially straight edges enabling for easy alignment of apparatus 100 with any straight edges on an oven or other appliance.

In accordance with embodiments described herein, attachments 104 and 106 may include magnetic strips allowing for attachment of apparatus 100 to metal surfaces. In addition, in some embodiments, attachments 104 and 106 may include square or circle magnets. For example, the square or circle magnets may be arranged at each corner of sheet material 102. In some embodiments, magnet portions of attachments 104 and 106 may be sealed in a flexible, watertight plastic sheath for protection against moisture and corrosion when apparatus 100 is exposed to water or other liquids.

Still yet, in some embodiments, attachments 104 and 106 may include hook-and-loop fasteners (or Velcro®). For example, two lineal fabric strips (or, alternatively, round "dots" or squares) may be attached to opposing surfaces (such as second side 110 of sheet material 102 and the front of an oven) to be fastened. Further, in some embodiments, attachments 104 and 106 may include hook-and-eye closure system. For example, hooks (e.g., flattened wire bent to the required shape) and eyes (or "eyelet") into which the hooks fit may be attached to opposing surfaces (such as second side 110 of sheet material 102 and the front of an oven). Any of these configurations of attachments 104 and 106 described above will enable for placement and holding of one side (e.g., second side 110) of sheet material 102 substantially flush against a front of an oven.

To help further illustrate the various features of apparatus 100, FIG. 2 is provided. FIG. 2 shows a back-side perspective view of apparatus 100. From this perspective, a second side 110 (not pictured in FIG. 1) is exposed and the same features of apparatus 100 described with reference to FIG. 1 are shown in FIG. 2. In some embodiments, apparatus 100 includes a plurality of discrete magnets, each connected to sheet material 102 at a respective corner of the sheet material 102. As illustrated in FIG. 2, one or more magnets 116 may be disposed at each respective corner of sheet material 102. Further, in some embodiments, one or more magnets 116 may be embedded (e.g., sewn in) into the sheet material 102.

III. Method for Using an Apparatus for Retaining Dissipated Heat

Figure 3C:
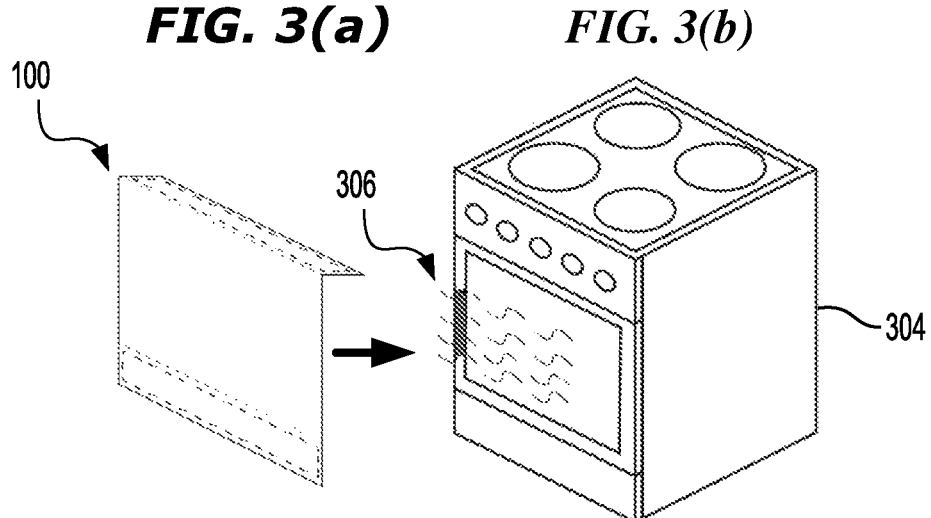
Figure 3D:
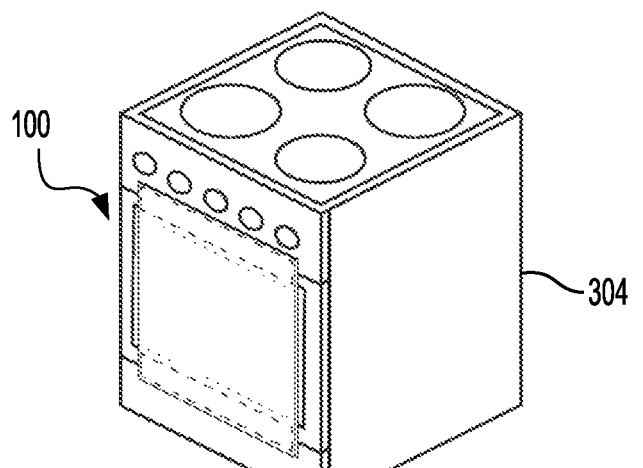

FIGS. 3(*a*)-3(*d*) will now be described, with continued reference to FIGS. 1 and 2, to illustrate an exemplary manner of using the apparatus for retaining dissipated heat. More specifically, what will be described is one exemplary method for using the apparatus in the context of retaining heat dissipated from an oven. As mentioned, apparatus 100 is not limited to use with an oven and may be compatible for use with other devices or appliances that radiate closed heat. Apparatus 100 depicted in FIGS. 1 and 2 will be the embodiment used in the following description on how to use the apparatus. Apparatus 100 depicted in FIGS. 1 and 2 and any embodiments described above may be used similarly to apparatus 100 as described below to the extent that other embodiments possess a similar or same feature set as apparatus 100 that enable such use. Other structural and operational embodiments will be apparent to persons skilled in the relevant art(s) based on the following discussion with reference to FIGS. 3(*a*)-3(*d*).

FIG. 3(*a*) depicts applying a heat-absorbing compound to apparatus 100. For example, in FIG. 3(*a*), water pouring out from a faucet 302 is applied to apparatus 100 by placing apparatus 100 under faucet 302. In accordance with embodiments described herein, absorbent fabric of sheet material 102 of apparatus 100 may retain or absorb the water from faucet 302. In some embodiments, apparatus 100 may be soaked in water and/or another heat-absorbing compound. As depicted in FIG. 3(*b*), in some instances, apparatus 100 may be wrung out (or squeezed) to extract excess water and/or another heat-absorbing compound.

In FIG. 3(*c*), after the absorbent fabric of sheet material 102 retains or absorbs the heat-absorbing compound, apparatus 100 may be placed against the front of an oven 304, which is shown to be radiating heat 306. As heat is dissipated from oven 304, a wet sheet material 102 of apparatus 100 absorbs the heat. As described with reference to FIGS. 1 and 2, edges 118 and 120 of sheet material 102 may be substantially straight edges that enable a person to align apparatus 100 with any straight edges on an oven or other appliance.

FIG. 3(*d*) depicts an exemplary placement of apparatus 100 on the front of oven 304. As described, in some embodiments, apparatus 100 may attach to the top of the oven door by a magnet that is embedded (e.g., sewn in) into the sheet material 102. For example, magnetic attachments 104 and 106 may attach to the metal portions of the front of oven 304. Attachments 104 and 106 may hold one side (e.g., a first side 108 or a second side 110) of sheet material 102 substantially flush against the front of oven 304 after sheet material 102 has retained or absorbed the heat-absorbing compound (e.g., water). As further depicted in FIG. 3(*d*), sheet material 102 of apparatus 100 may be sized to cover a majority of the front of oven 304. In accordance with embodiments described herein, sheet material 102 of apparatus 100 may assume different sizes for compatibility with various appliances.

Embodiments described herein are beneficial to various communities, such as the senior population, people with older homes, and people with heat intolerant breathing issues. Apparatus 100 absorbs heat radiated from an oven instead of the heat being released into the kitchen. Embodiments described herein also prevent dangerous burns for children and pets, and the Tiny House community. For example, with apparatus 100 placed on the front of an oven, if a pet places its paw or a toddler places his or her hand on the oven door during cooking, the damp sheet material of the apparatus 100 will act as a barrier and prevents burns.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments but should be defined only in accordance with the following claims and their equivalents.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 1 illustrates a front-side perspective view of apparatus for retaining dissipated heat, in accordance with an embodiment.

FIG. 2 provides a back-side perspective view the apparatus for retaining dissipated heat depicted in FIG. 1, in accordance with an embodiment.

FIGS. 3(*a*)-3(*d*) illustrate an exemplary manner of using the apparatus for retaining dissipated heat depicted in FIGS. 1 and 2.

The features and advantages of the present apparatus will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to an apparatus for retaining heat dissipated from an oven. The apparatus may comprise a sheet material sized to cover a portion of a front of the oven and at least one attachment connected to the sheet material. The sheet material may comprise an absorbent fabric for retaining a heat-absorbing compound. The at least one attachment may be configured to hold one side of the sheet material substantially flush against the front of the oven after the sheet material has retained the heat absorbing compound.

Further features and advantages of the apparatus, as well as the structure and operation of various embodiments of the apparatus, are described in detail below with reference to the accompanying drawings. It is noted that the apparatus is not limited to the specific embodiments described herein. Such embodiments are presented herein for illustrative purposes only. Additional embodiments will be apparent to persons skilled in the relevant art(s) based on the teachings contained herein.

What is claimed is:

1. An apparatus for retaining heat dissipated from an oven, the apparatus comprising:
   a sheet material for covering a heated surface of the oven, the sheet material comprising an absorbent fabric for retaining a heat absorbing compound, the heated surface extending in a substantially vertical orientation relative to a direction of gravitational force, wherein the sheet material is substantially shaped as a square;
   a first magnetic strip attachment connected to the sheet material, the first magnetic strip attachment connected to the sheet material such that an edge of the first magnetic strip attachment is arranged to substantially align with a first edge of the sheet material and extend a portion of a length of the first edge of the sheet material;
   a second magnetic strip attachment connected to the sheet material such that an edge of the second magnetic strip attachment is arranged to substantially align with a second edge of the sheet material and extend a portion of a length of the second edge of the sheet material, the second edge of the sheet material being opposite to the first edge of the sheet material,
   a plurality of discrete magnets, each connected to the sheet material at a respective corner of the sheet material,
   wherein the first and second magnetic strip attachments and the plurality of discrete magnets are dimensioned such that, when the sheet material is placed in the substantially vertical orientation against the heated surface of the oven, the sheet material is maintained substantially flush against the heated surface of the oven after the sheet material has retained the heat absorbing compound.

2. The apparatus of claim 1, wherein the sheet material further comprises an internal cavity suitable for encasing the first magnetic strip attachment.

3. The apparatus of claim 1, wherein the sheet material further comprises another internal cavity suitable for encasing the second magnetic strip attachment.

4. The apparatus of claim 1, wherein the absorbent fabric is made of at least one of the following: linen, cotton, rayon, wool, terry cloth, fleece, hemp, and bamboo.

5. The apparatus of claim 1, wherein the first magnetic strip attachment extends a majority portion of the length of the first edge of the sheet material.

6. The apparatus of claim 1, wherein the second magnetic strip attachment extends a majority portion of the length of the second edge of the sheet material.

7. A method for retaining heat dissipated from an appliance, comprising:
   applying a heat-absorbing compound to a sheet material comprising an absorbent fabric;
   positioning the sheet material in a substantially vertical orientation against a heated surface of the appliance, the sheet material having a first edge and a second edge opposite the first edge;
   magnetically attaching a first magnetic strip attachment connected to the sheet material along substantially an entire length of the first edge of the sheet material to a first portion of the heated surface of the appliance; and
   magnetically attaching a second magnetic strip attachment connected to the sheet material along substantially an entire length of the second edge of the sheet material to a second portion of the heated surface of the appliance, wherein the first and second magnetic strip attachments cooperatively retain the sheet material substantially flush against the heated surface of the appliance after the sheet material has retained the heat-absorbing compound.

8. The method of claim 7, further comprising:
   wringing the sheet material after application of the heat-absorbing compound to remove any excess of the heat-absorbing compound.

9. A method for retaining heat dissipated from an appliance, comprising:
   applying a heat-absorbing compound to a sheet material comprising an absorbent fabric;
   positioning the sheet material in a substantially vertical orientation against a heated surface of the appliance; and
   magnetically attaching a plurality of discrete magnets to the heated surface of the appliance, each of the plurality of discrete magnets connected to the sheet material at each respective corner of the sheet material, wherein the plurality of discrete magnets cooperatively retain the sheet material substantially flush against the heated surface of the appliance after the sheet material has retained the heat-absorbing compound.

10. The method of claim 9, further comprising:
   wringing the sheet material after application of the heat-absorbing compound to remove any excess of the heat-absorbing compound.

* * * * *